July 8, 1952          H. CONNOLLY          2,602,677
ADJUSTABLE PEDAL CRANK HUB FOR BICYCLE FRAMES
Filed Aug. 5, 1948          2 SHEETS—SHEET 1
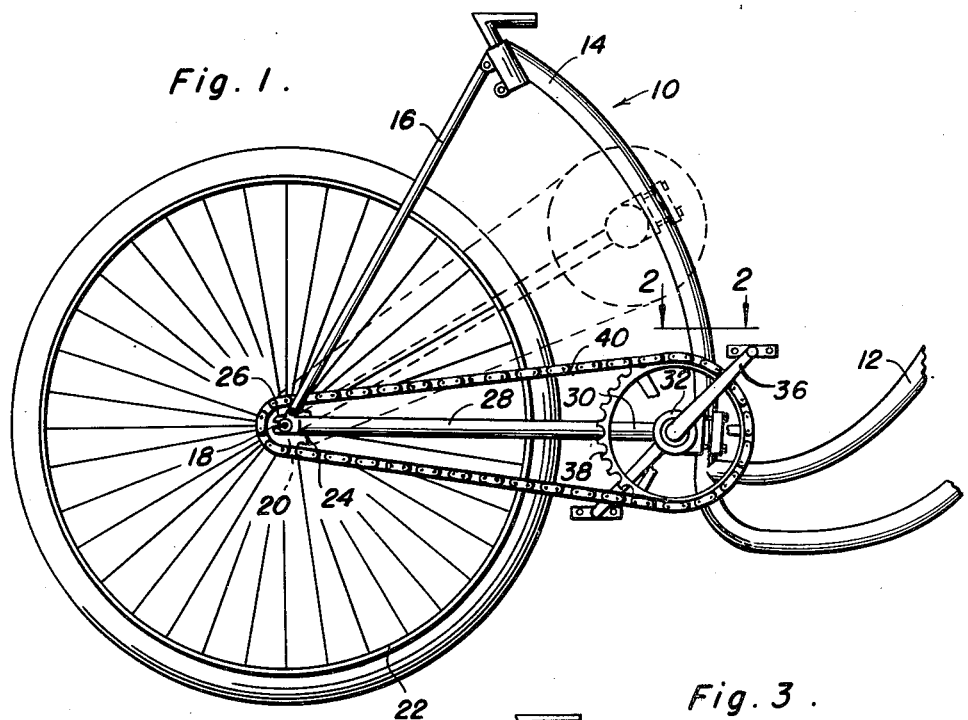
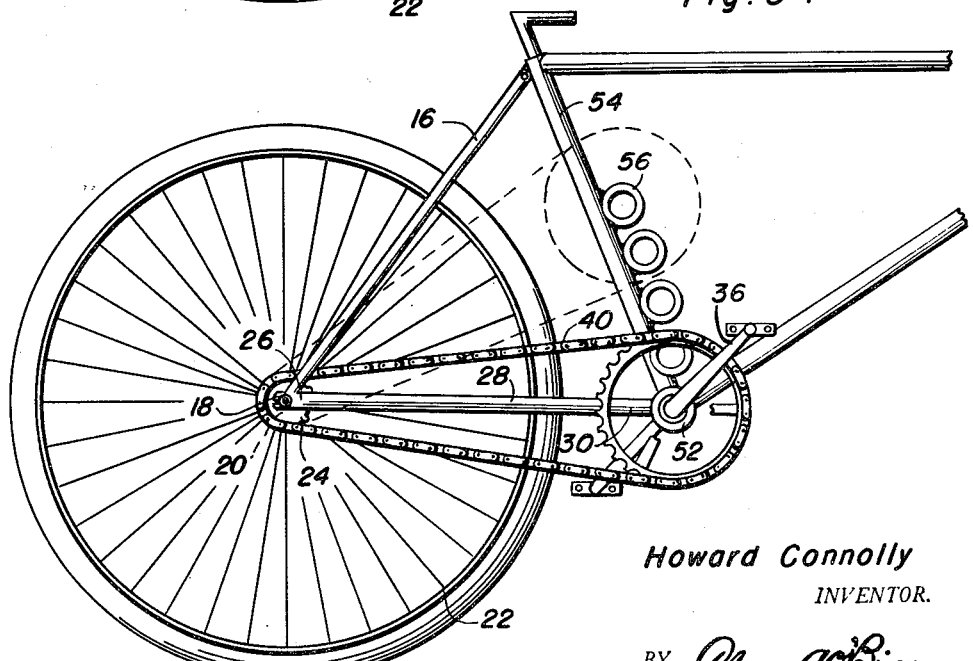
Howard Connolly
INVENTOR.

July 8, 1952 H. CONNOLLY 2,602,677
ADJUSTABLE PEDAL CRANK HUB FOR BICYCLE FRAMES
Filed Aug. 5, 1948 2 SHEETS—SHEET 2
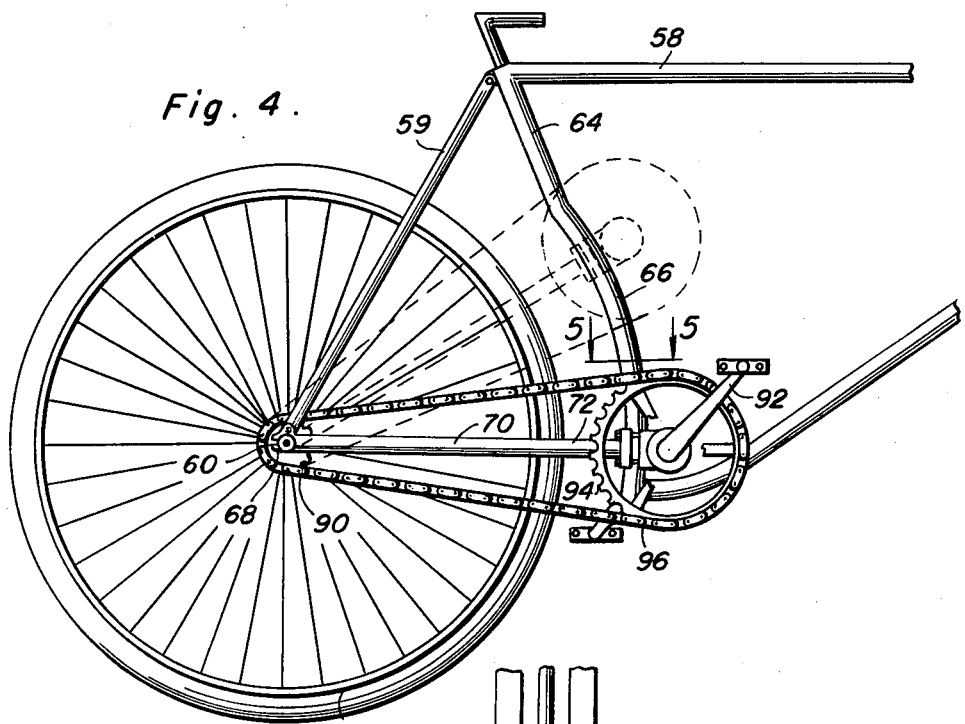
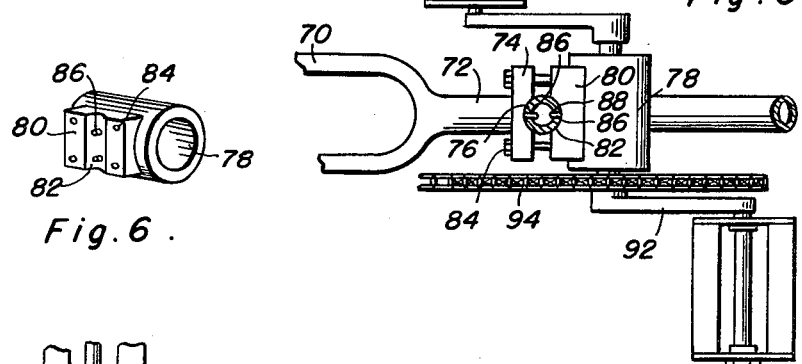
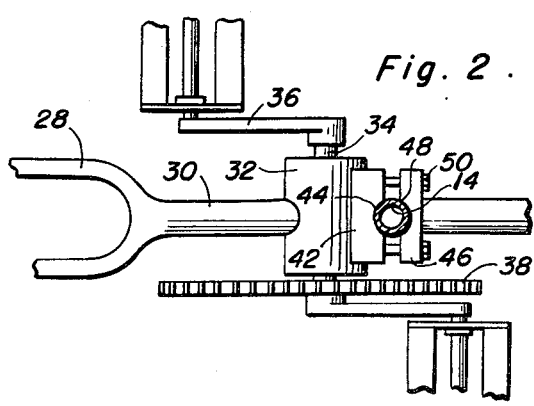
Howard Connolly
INVENTOR.

Patented July 8, 1952

2,602,677

UNITED STATES PATENT OFFICE 2,602,677

ADJUSTABLE PEDAL CRANK HUB FOR BICYCLE FRAMES

Howard Connolly, Deming, N. Mex.; Frances L. Connolly, administratrix of said Howard Connolly, deceased, assignor to Frances L. Connolly, Deming, N. Mex.

Application August 5, 1948, Serial No. 42,623

2 Claims. (Cl. 280—261)

This invention relates to new and useful improvements in wheeled frames and the primary object of the present invention is to provide an adjustable crank hub for bicycles that is so designed as to accommodate persons of various sizes by selectively retaining the pedal crank hub disposed at a predetermined distance below the bicycle seat.

Another important object of the present invention is to provide a bicycle or tricycle frame including a novel and improved pedal crank hub supporting element that is movable and adjustable in an arcuate path so that the driving connection between the pedal crank hub and the driving wheel of the bicycle will be substantially taut at all times during various positions of the hub.

A further object of the present invention is to provide an adjustable pedal crank hub for a bicycle frame that is quickly and readily applied to or removed from a bicycle frame in a convenient manner and which is applicable for all types of bicycle frames which may or may not include a cross bar or horizontal bar.

A still further aim of the present invention is to provide an adjustable support for pedal crank hubs of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a bicycle and showing the present invention applied thereto, and with dotted lines showing alternate positions for the crank pedal hub;

Figure 2 is an enlarged fragmentary horizontal sectional view taken substantially on the plane of section line 2—2 of Figure 1;

Figure 3 is a fragmentary side elevational view of a bicycle and showing the present invention in slightly modified form applied thereto;

Figure 4 is a fragmentary side elevational view of a bicycle and showing the present invention in further modified form applied thereto;

Figure 5 is an enlarged fragmentary horizontal sectional view taken substantially in the direction of section line 5—5 of Figure 4; and, Figure 6 is a perspective view of one portion of the follower that is used in conjunction with that embodiment of the invention illustrated in Figures 4 and 5.

Referring now to the drawings in detail, and more particularly to Figures 1 and 2, wherein for the purpose of illustration, there is disclosed one embodiment of the present invention, the numeral 10 represents a bicycle generally, including a frame 12 having an arcuate seat supporting post or guide 14.

Pivoted to the upper portion of the post 14 is a rear fork 16 the lower free ends of which support a rear axle 18 that receive the bearing portion 20 of a rear spoked wheel 22.

Suitably fixed to the wheel 22, is a driven sprocket 24 that will rotate with the driven wheel 22.

Pivotally secured on the rear axle or bolt 18, are the bifurcated terminals 26 of a substantially U-shaped member 28 from the web portion of which there projects a rigid arm 30 that is rigidly attached to a pedal crank hub 32.

The axle portion 34 of a pedal crank 36 is rotatably carried by the hub 32 and a drive sprocket 38 is fixed to axle portion 34. The sprockets 38 and 24 are connected by an endless drive chain 40 whereby upon a rotation of the pedal crank 34, the drive wheel 22 will be rotated in a manner conventional for bicycle and tricycle structures.

A block or follower member 42 is rigidly attached to the hub 32 and includes a concaved bearing face 44 that engages the guide 14. Internally threaded recesses are provided in the block 42 and register with suitable apertures provided in a complementary follower or block 46 having a concaved recess 48 that engages the guide 14. Bolts 50 extend through the apertures in the block 46 and receivably engage the internally threaded recesses provided in the block 42 for adjustment of the hub 32 on the guide 14.

It should be noted that the guide 14 is disposed in an arcuate path equidistant from the driven sprocket 24 so that the chain 40 will remain substantially taut throughout various peripheral adjustment of the hub 32.

Reference is now directed to Figure 3, wherein there is disclosed the present invention in slightly modified form. In this embodiment, all other parts being similar to that previously described, the blocks 42 and 46 are not employed and a crank pedal hub 52 is fixed to the arm 30 projecting from the U-shaped member 28.

The guide 54 in this embodiment is substantially straight and supports a plurality of spaced auxiliary hubs 56 the longitudinal axes of which are spaced equidistant from the center of the driven sprocket 24.

In practical use of the present invention in modified form, and as illustrated in Figure 3, the crank pedal 34 is disposed in a selected one of the hubs 56 to retain the drive chain 40 substantially taut regardless of which of the hubs the crank pedal 34 is associated, see dotted lines of Figure 3.

Reference is next directed to Figures 4, 5 and 6, wherein there is disclosed the present invention in further modified form. In this embodiment, the numeral 58 represents a bicycle frame including a rear fork 59 that rotatably supports the axle 60 of a rear wheel 62.

A seat supporting post or guide 64 forms a portion of the frame 58 and includes an arcuate portion 66 that is disposed in a path equidistant from the axle 60.

The bifurcated terminals 68 of a substantially U-shaped member 70 are pivoted on the axle 60 and a rigid arm 72 projects from the web portion of the member 70 and supports a fixed block or follower member 74 having a concaved bearing surface 76 that engages the arcuate portion 66 of the guide 64.

Rigidly secured to the outer periphery of a pedal crank hub 78, is a further follower member or block 80 having a concaved recess 82 that receives the arcuate portion 66 of the guide 64.

Internally threaded recesses 84 provided in the block 80 oppose suitable apertures provided in the block 74 and receivably engage fasteners or bolts 84 that extend through the apertures in the block 80.

Lugs 86 project outwardly from the concaved recesses in the blocks 74 and 80 and engage suitable apertures 88 provided in the arcuate portion of the guide 64 to retain the hub 78 in a selected adjusted position on the portion 66 and equidistant from the rear sprocket 90 that is fixed to the wheel 62.

A pedal crank 92 is rotatably supported by the hub 78 and supports a sprocket 94 that is connected to the sprocket 90 by an endless chain 96.

Having described the invention, what is claimed as new is:

1. In a bicycle including a seat supporting post having an arcuate portion, a rear wheel supporting fork, a rear axle carried by said fork, a rear wheel on said axle, a sprocket mounted on said axle, an elongated support having forward and rear end portions, the rear end portion of said support being bifurcated and pivoted on the axle, a pedal supporting hub secured to the forward end portion of said support and disposed transversely of said support, and forwardly of the periphery of said wheel, a pedal crank mounted in said hub, a sprocket carried by said crank and connected to said first-mentioned sprocket, a follower composed of first and second halves, each of said halves having a concaved recess receiving said arcuate portion, one of said halves being fixed to the hub, fasteners adjustably securing the halves together, and interconnecting means between said follower and said arcuate portion for retaining the follower adjusted on said arcuate portion.

2. The combination of claim 1, wherein said arcuate portion is provided with a plurality of spaced openings, each half of said follower having projecting lugs selectively received in said openings.

HOWARD CONNOLLY.

REFERENCES CITED

The following references are of record in the file of this patent:

UNITED STATES PATENTS

| Number | Name | Date |
|---|---|---|
| 387,979 | Latta | Aug. 14, 1888 |
| 401,295 | Norton | Apr. 9, 1889 |
| 426,855 | Reed | Apr. 29, 1890 |
| 1,974,080 | Marker et al. | Sept. 18, 1934 |
| 2,229,468 | Morgan | Jan. 21, 1941 |

FOREIGN PATENTS

| Number | Country | Date |
|---|---|---|
| 12,413 | Great Britain | A. D. 1887 |